United States Patent
Wu

(10) Patent No.: US 9,313,039 B2
(45) Date of Patent: Apr. 12, 2016

(54) METHOD OF HANDLING MEASUREMENT CAPABILITY AND RELATED COMMUNICATION DEVICE

(71) Applicant: HTC Corporation, Taoyuan County (TW)

(72) Inventor: Chih-Hsiang Wu, Taoyuan County (TW)

(73) Assignee: HTC Corporation, Xinghua Road, Taoyuan District, Taoyuan (TW)

( * ) Notice: Subject to any disclaimer, the term of this patent is extended or adjusted under 35 U.S.C. 154(b) by 41 days.

(21) Appl. No.: 14/309,871

(22) Filed: Jun. 19, 2014

(65) Prior Publication Data

US 2014/0301229 A1 Oct. 9, 2014

Related U.S. Application Data

(62) Division of application No. 12/760,570, filed on Apr. 15, 2010, now Pat. No. 8,787,921.

(60) Provisional application No. 61/169,319, filed on Apr. 15, 2009.

(51) Int. Cl.
  *H04L 12/18* (2006.01)
  *H04W 24/10* (2009.01)
  *H04W 4/06* (2009.01)
  *H04W 24/08* (2009.01)

(52) U.S. Cl.
  CPC ............. *H04L 12/189* (2013.01); *H04W 4/06* (2013.01); *H04W 24/08* (2013.01); *H04W 24/10* (2013.01)

(58) Field of Classification Search
  None
  See application file for complete search history.

(56) References Cited

U.S. PATENT DOCUMENTS

| 7,729,315 | B2* | 6/2010 | Lindoff | H04J 11/0093 370/332 |
|---|---|---|---|---|
| 8,165,175 | B2 | 4/2012 | Wang | |
| 2007/0097914 | A1* | 5/2007 | Grilli | H04W 36/0088 370/329 |
| 2008/0242298 | A1 | 10/2008 | Nylander | |
| 2009/0010219 | A1* | 1/2009 | Lee | H04W 28/20 370/329 |
| 2009/0185524 | A1* | 7/2009 | Sammour | H04J 11/0069 370/328 |

FOREIGN PATENT DOCUMENTS

| EP | 1467582 A1 | 10/2004 |
|---|---|---|
| EP | 1 853 081 A1 | 11/2007 |

(Continued)

OTHER PUBLICATIONS

3GPP TR 36.814 V0.4.1 3rd Generation Partnership Project; Technical Specification Group Radio Access Network; Further Advancements for E-UTRA Physical Layer Aspects (Release 9), Feb. 2009.

(Continued)

*Primary Examiner* — Hong Cho
(74) *Attorney, Agent, or Firm* — Winston Hsu; Scott Margo

(57) ABSTRACT

A method of handling measurement capability for a mobile device capable of communicating with a network through a plurality of component carriers in a wireless communication system is disclosed. The method comprises receiving a measurement command from the network, and performing an inter-frequency measurement without measurement gap configured to any of the plurality of component carriers according to the measurement command, when the mobile device receives data on less than all of the plurality of component carriers.

12 Claims, 7 Drawing Sheets

(56) References Cited

FOREIGN PATENT DOCUMENTS

| WO | 2004091241 A1 | 10/2004 |
| WO | 2008043560 A1 | 4/2008 |
| WO | 2008149534 A1 | 12/2008 |

OTHER PUBLICATIONS

3GPP TS 36.300 V8.8.0 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Mar. 2009.

"Evolved Universal Terrestrial Radio Access (E-UTRA) and Evolved Universal Terrestrial Radio Access (E-UTRAN); Overall description; Stage 2 (3GPP TS 36.300 version 8.4.0 Release 8)", ETSI TS 136 300 V8.4.0, Apr. 2008, cover page and pp. 1-129, XP014041816, ETSI, France.

European patent application No. 12005645.2, European Search Report mailing date:Oct. 29, 2012.

* cited by examiner

METHOD OF HANDLING MEASUREMENT CAPABILITY AND RELATED COMMUNICATION DEVICE

CROSS REFERENCE TO RELATED APPLICATIONS

This application is a division of U.S. application Ser. No. 12/760,570 filed on Apr. 15, 2010, which claims the benefit of U.S. Provisional Application No. 61/169,319, filed on Apr. 15, 2009.

BACKGROUND OF THE INVENTION

1. Field of the Invention

The application relates to a method utilized in a wireless communication system and a communication device thereof, and more particularly, to a method of handling measurement capability in a wireless communication system and a related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In the LTE system, a user equipment (UE) may perform measurement to measure communication quality, such as quality of a frequency layer or strength of a radio signal, which is controlled by the E-UTRAN, due to mobility of the UE. Measurement can be divided into two types according to the current operating frequency of the UE, which are an intra-frequency measurement and an inter-frequency/inter-RAT measurement. The intra-frequency measurement is predominantly performed for the mobility within the same frequency layer (i.e. between cells with the same carrier frequency), whereas the inter-frequency/inter-RAT measurement is predominantly performed for the mobility between different frequency layers (i.e. between cells with a different carrier frequency). In addition, the inter-frequency/inter-RAT measurement is performed during uplink/downlink idle periods, such as a measurement gap configured by the network. During the measurement gap, both the uplink and downlink transmissions are prohibited, and thereby the inter-frequency/inter-RAT measurement can be performed within the measurement gap.

Toward advanced high-speed wireless communication system, such as transmitting data in a higher peak data rate, LTE-Advanced system is standardized by the 3rd Generation Partnership Project (3GPP) as an enhancement of LTE system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and/or transmitting.

In addition, COMP is considered for LTE-Advanced as a tool to improve coverage of high data rates, cell edge throughput, and system efficiency, which implies dynamic coordination among multiple geographical separated points. That is, when an UE is in a cell-edge region, the UE is able to receive signal from multiple cells, and the multiple cells can receive transmission of the UE.

However, in the LTE system, measurement functionality is defined for the UE supporting a single component carrier. The network always configures a measurement gap to the UE for the inter-frequency/inter-RAT measurement. For the UE operated in the LTE-Advanced system, the measurement functionality is not clear defined for the UE supporting multiple component carriers. Improper configuration of the measurement gap may cause packet scheduling problems. Since data transmission/reception cannot be performed during the measurement gap, transmission/reception performance of the UE is downgraded.

In addition, consider a scenario related to multimedia broadcast multicast service (MBMS). The MBMS gives the opportunity to broadcast or multicast TV, film, information such as free overnight transmission of newspaper in digital form and other media in these networks. Since the MBMS is a broadcast or multicast service, the network is unable to know which one of the UEs receives the MBMS data when the MBMS is provided by the network. This causes difficulty in measurement gap configuration for the network.

SUMMARY OF THE INVENTION

An embodiment of the present invention discloses a method of handling measurement capability for a mobile device capable of communicating with a network through a plurality of component carriers in a wireless communication system. The method comprises receiving a measurement command from the network, and performing an inter-frequency measurement without measurement gap configured to any of the plurality of component carriers according to the measurement command, when the mobile device receives data on less than all of the plurality of component carriers.

An embodiment of the present invention further discloses a method of handling measurement capability for a mobile device capable of communicating with a network through a plurality of component carriers in a wireless communication system. The method comprises when the mobile device receives data with all of the plurality of component carriers, sending a message to notify the network that the mobile device receives the data with all of the plurality of component carriers, wherein the message further indicates to the network that a measurement gap is required for an inter-frequency measurement, and performing the inter-frequency measurement on one of the plurality of component carriers when the network configures the measurement gap to the component carrier.

An embodiment of the present invention further discloses a communication device of a wireless communication system for handling measurement capability. The communication device is capable of communicating with a network through a plurality of component carriers in the wireless communication system and comprises means for receiving a measurement command from the network, and means for performing an inter-frequency measurement without measurement gap configured to any of the plurality of component carriers according to the measurement command when the communication device receives data on less than all of the plurality of component carriers.

An embodiment of the present invention further discloses a communication device of a wireless communication system for handling measurement capability. The communication device is capable of communicating with a network through a plurality of component carriers in the wireless communication system and comprises means for sending a message to notify the network that the communication device receives the data with all of the plurality of component carriers when the communication device receives data with all of the plurality of component carriers, wherein the message further indicates to the network that a measurement gap is required for an inter-frequency measurement, and means for performing the inter-frequency measurement on one of the plurality of component carriers when the network configures the measurement gap to the component carrier.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
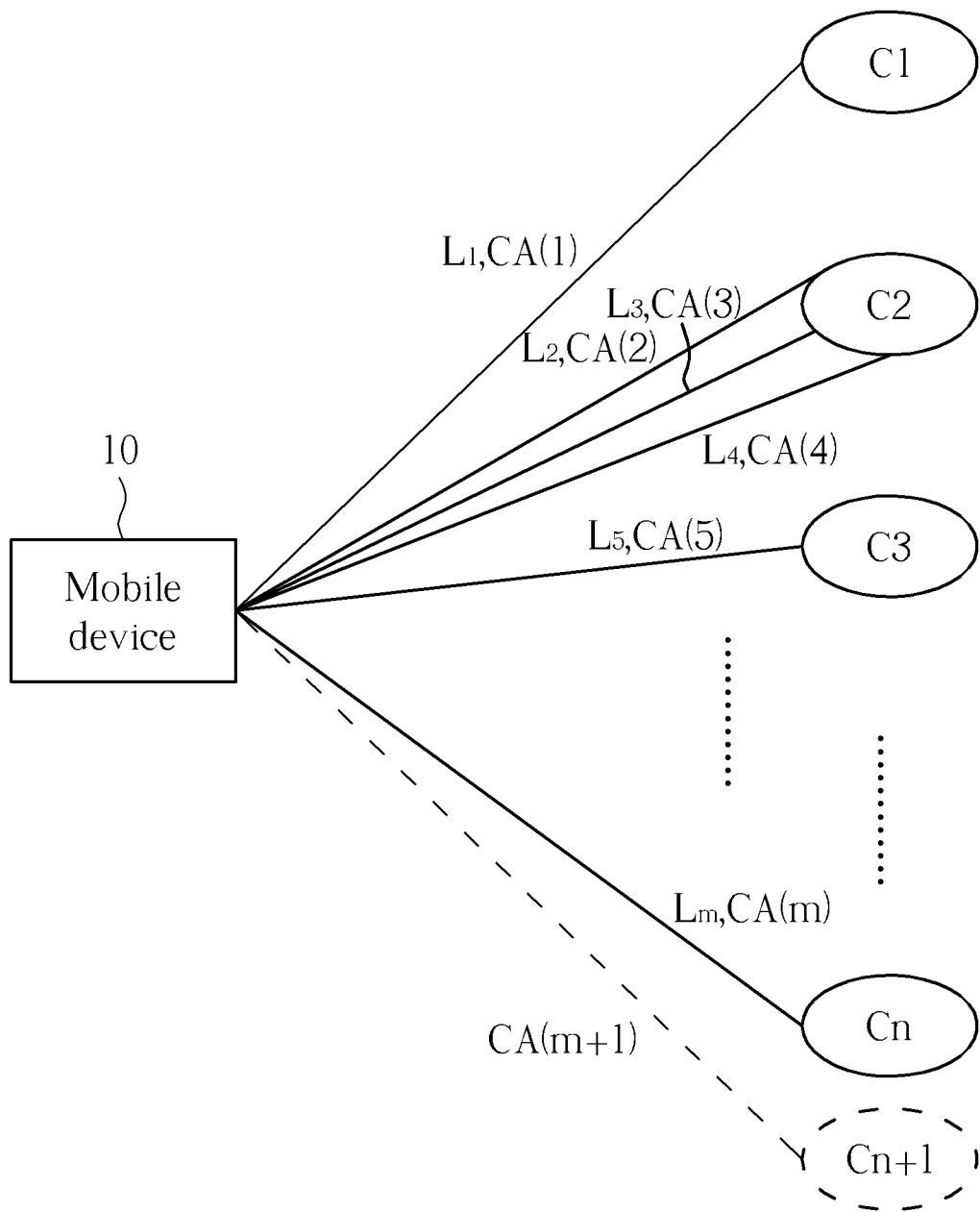
FIG. 1 is a schematic diagram of a wireless communication system.

Please refer to FIG. 1, which illustrates a schematic diagram of a wireless communication system featuring multiple connections between a mobile device 10 and cells C1-Cn. The wireless communication system may be a LTE-Advanced system. The mobile device 10 can operate with carrier aggregation and COMP. In FIG. 1, the mobile device 10 communicates with the cells C1-Cn through radio links L1-Lm that correspond to component carriers CA(1)-CA(m) configured in the mobile device 10 respectively. Each of the component carriers CA(1)-CA(m) corresponds to a radio frequency (RF) channel whose bandwidth may be varied according to different communication systems. In addition, the mobile device 10 is referred as a user equipment (UE) or a mobile station (MS), and can be a device such as a mobile phone, a computer system, etc. The mobile device 10 may perform inter-frequency measurement for measuring signal strength of a component carrier which has different carrier frequency from frequencies of the component carriers CA(1)-CA(m), or perform inter-RAT measurement for measuring a component carrier CA(m+1) except the component carriers CA(1)-CA(m).

Figure 2:
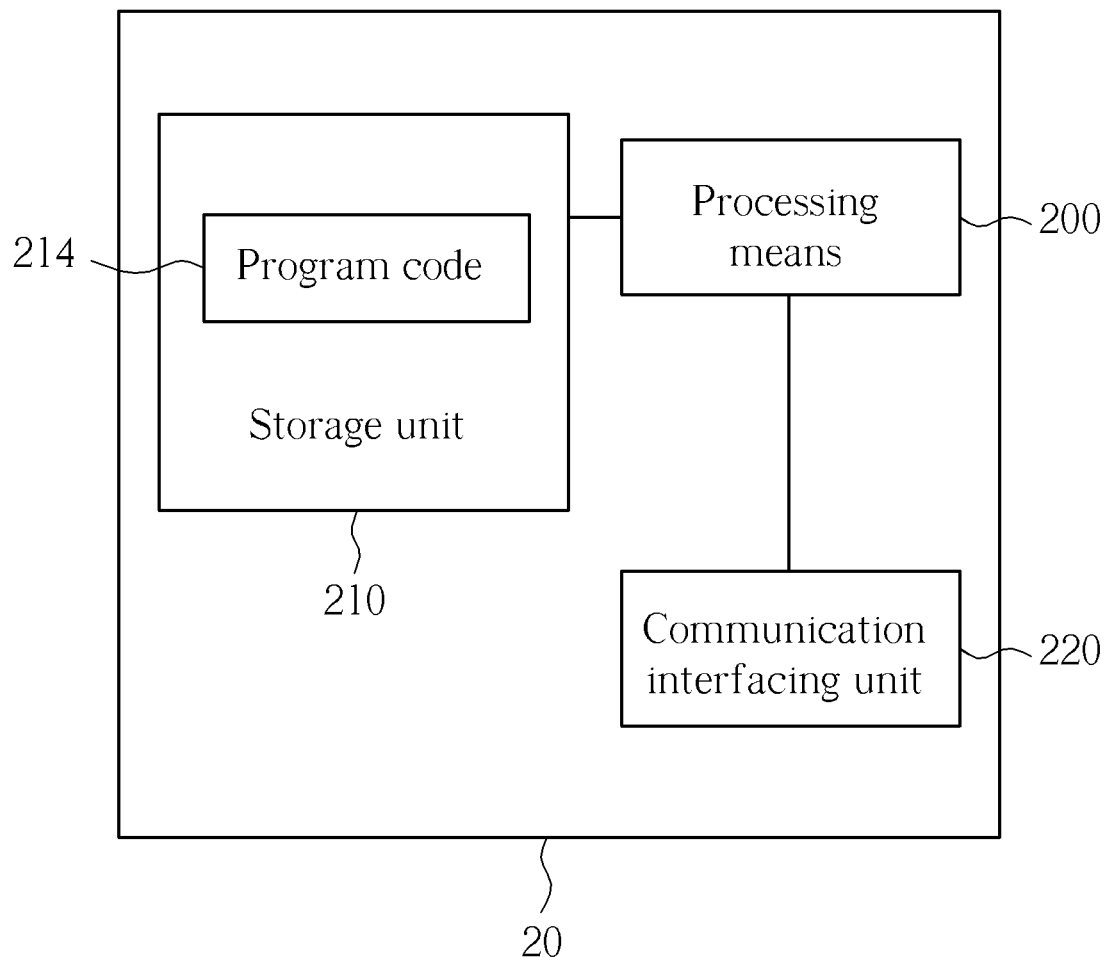
FIG. 2 is a schematic diagram of an exemplary communication device according to the present disclosure.

FIG. 2 illustrates a schematic diagram of an exemplary communication device 20. The communication device 20 can be the mobile device 10 shown in FIG. 1, but is not limited herein. The communication device 20 may include a processing means 200 such as a microprocessor or ASIC, a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), random-access memory (RAM), CD-ROMs, magnetic tapes, hard disks, and optical data storage devices. The communication interfacing unit 220 is preferably a radio transceiver and can exchange wireless signals with the network according to processing results of the processing means 200.

The program code 214 includes a program code of a RRC layer which can activate measurement functionality according to measurement configurations received from the network. The RRC layer is used for performing RRC connection management, measurement control and reporting, and radio bearer (RB) control responsible for generating or releasing radio bearers (RBs). In addition, the RRC layer includes a RRC_CONNECTED state capable of using the RBs, and a RRC_IDLE state incapable of using the RBs.

For measurement mechanism in the LTE-Advanced system, the applicant takes measurement capability of the UE into consideration. Assume that a UE of the LTE-Advanced system supports two component carriers. If the UE receives data only on one of the component carriers, the UE shall be able to perform the inter-frequency/inter-RAT measurement without measurement gap assistance of the network. That is, the network does not necessarily configure the measurement gap to the UE for the inter-frequency/inter-RAT measurement. As a result, a basis for measurement gap configuration determination is required for the network in the LTE-Advanced system.

In addition, the UE shall provide proper information to the network so that the network can know the usage status of the component carriers of the UE. Therefore, the network can correctly determine whether a measurement gap is required for the UE for the inter-frequency/inter-RAT measurement. Thus, how to transfer the information to the network is also provided herein.

Figure 3:
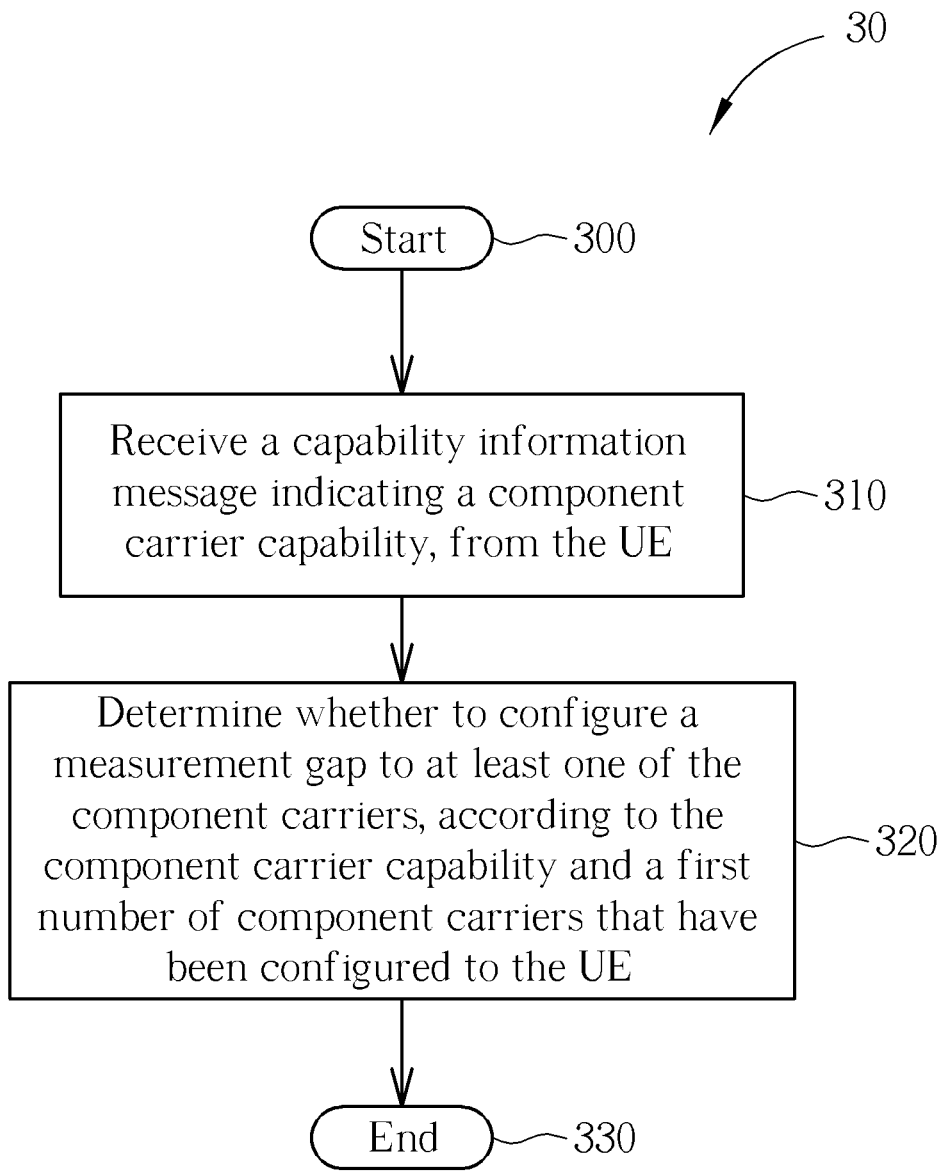
FIGS. 3-7 are flowcharts of exemplary processes according to the present disclosure.

Please refer to FIG. 3, which illustrates a flowchart of an exemplary process 30. The process 30 is utilized in the network for handling measurement capability of a UE capable of supporting a maximum number of component carriers in a wireless communication system, in order to provide a criterion for measurement gap configuration determination. The network may be an evolved Node-B (eNB) or a cell (e.g. any of the cells C1-Cn). The process 30 can be compiled into the program code 214 and includes the following steps:

Step 300: Start.

Step 310: Receive a capability information message indicating a component carrier capability, from the UE.

Step 320: Determine whether to configure a measurement gap to at least one of the component carriers, according to the component carrier capability and a first number of component carriers that have been configured to the UE.

Step 330: End.

According to the process 30, the network determines whether to configure the measurement gap to at least one of the component carriers according to the component carrier capability which may include the maximum number of the component carriers on which the UE receives data and according to the first number of component carriers that the network configures to the UE to receive data.

The measurement gap configuration determination is described as follows. After the network receives the capability information message indicating the component carrier capability, the network compares the maximum number of the component carriers indicated by the component carrier capability and the first number of component carriers having been configured to receive data. If the first number of component carriers that have been configured to receive data is equal to the maximum number of the indicated component carriers, the network configures the measurement gap to at least one of the component carriers. That is, the network configures the measurement gap(s) to at least one of the component carriers for the inter-frequency/inter-RAT measurement when the UE receives data with the maximum number of the component carriers. On the other hand, the network does not configure the measurement gap to any of the component carriers for the inter-frequency/inter-RAT measurement when the UE receives data on part of the component carriers. With such manner, the network can properly configure the measurement gap to each component carrier of the UE for the inter-frequency/inter-RAT measurement.

Referring back to FIG. 1, take an example based on the concept of the process 30. As shown in FIG. 1, the UE supports m component carriers CA(1)-CA(m), thereby capable of receiving data on the m component carriers CA(1)-CA(m). The network receives the capability information message indicating the component carrier capability including the number of "m" from the UE, and the network compares the "m" and the number of component carriers that has been configured to the UE to receive data. If the network has configured (m−1) component carriers CA(1)-CA(m−1) to receive data, the network does not configure the measurement gap to the UE for the inter-frequency/inter-RAT measurement. On the other hand, if the network has configured all the component carriers to the UE for receiving data, the network configures the measurement gap to at least one of the component carriers of the UE for inter-frequency/inter-RAT measurement.

In addition, when no measurement gap is configured to the UE, the network can send a measurement command to command the UE to perform the inter-frequency measurement/inter-RAT measurement on at least one of the component carriers. Therefore, when the UE is not configured to receive data with the maximum number of the component carriers, the UE can perform the inter-frequency measurement/inter-RAT measurement without measurement gap assistance of the network. For example, when the UE receives data on the component carriers CA(1)-CA(m−1), the network does not configure any measurement gap to the UE, but sends the measurement command to command the UE to perform the inter-frequency measurement/inter-RAT measurement on the component carrier CA(m) that is not in-use for data reception. Please note that, the measurement command can command the UE to perform the inter-frequency measurement/inter-RAT measurement on any of the component carriers that are not configured to receive data. For example, if the UE is configured to receive data only on the component carrier CA(1), the network can command the UE to perform the inter-frequency measurement/inter-RAT measurement on any of the component carriers CA(2)-CA(m) via the measurement command.

Alternatively, the network configures the measurement gap for the inter-frequency/inter-RAT measurement when a message indicating that all of the component carriers are configured to receive data is received from the UE. That is, the UE sends the message to the network to notify that the UE receives data with the maximum number of the component carriers, and thereby the network configures the measurement gap to at least one of the component carriers. In addition, the message may further indicate to the network that the measurement gap is required for the inter-frequency/inter-RAT measurement. Therefore, the network can timely configure the measurement gap for the inter-frequency/inter-RAT measurement.

As the above mentioned, the measurement gap can be configured to ones of the component carriers. The component carriers that are configured with the measurement gap cannot perform data transmission/reception within the measurement gap, but only perform the inter-frequency/inter-RAT measurement. On the other hand, the un-configured component carriers can continue the data transmission/reception without measurement gap influence, thereby increasing usage efficiency of the component carriers of the UE. For example, the UE supporting data reception on m component carriers receives data on all of the component carriers CA(1)-CA(m). When the network requires the UE to perform the inter-frequency/inter-RAT measurement for a certain component carrier (e.g. a component carrier CA(m+1) shown in FIG. 1), which is not belonging to the component carriers CA(1)-CA(m), the network can configure the measurement gap only to a component carrier (e.g. the component carrier CA(1)). Therefore, the component carriers CA(2)-CA(m) are not affected by the measurement gap, and remains performing the data transmission/reception.

In addition, the network determines that the component carrier capability of the UE is changed, when reception of a multimedia broadcast multicast service (MBMS) message of the UE is activated on ones of the component carriers. The activated component carriers can be a dedicated component carrier only used for transmitting the MBMS message to the UE, or a mixed component carrier used for transmitting the MBMS message and unicast data to the UE. If the activated component carrier is the dedicated component carrier, the network determines that the maximum number of the component carriers that the UE is capable of using is changed. On the other hand, if the activated component carrier is the mixed component carrier, the network does not determine the maximum number of component carriers that the UE is capable of using is changed, and may configure the UE to remove the mixed component carrier for unicast data transmission.

Figure 4:
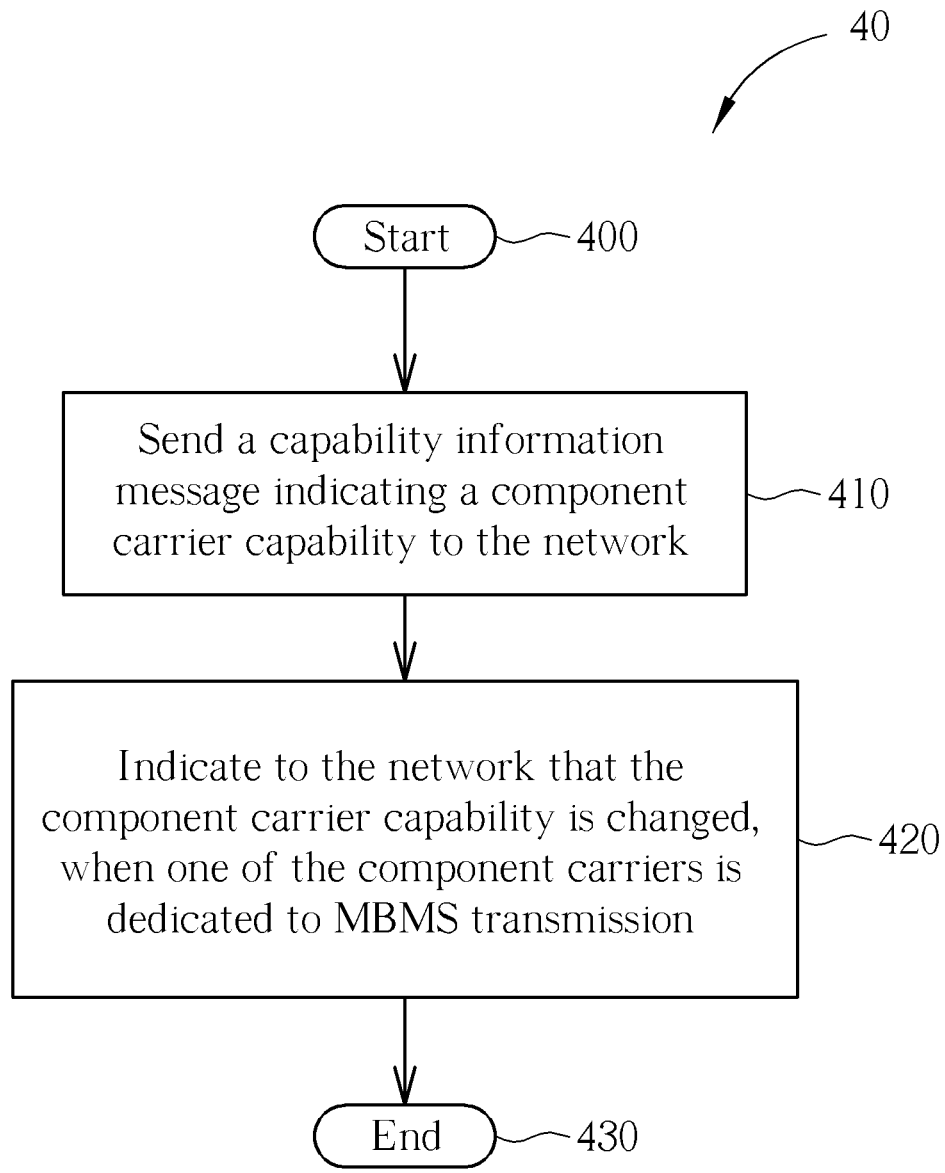

For clearly understanding the MBMS message reception activation, please refer to FIG. 4, which illustrates a flowchart of an exemplary process 40. The process 40 is utilized in the UE capable of supporting a maximum number of component carriers for handling measurement capability. The process 40 can be compiled into the program code 214 and includes the following steps:

Step 400: Start.

Step 410: Send a capability information message indicating a component carrier capability to the network.

Step 420: Indicate to the network that the component carrier capability is changed, when one of the component carriers is dedicated to MBMS transmission.

Step 430: End.

According to the process 40, the UE not only indicates the component carrier capability to the network, but also indicates the change of the component carrier capability to the network when the UE activates the MBMS reception on the dedicated component carrier(s).

Take an example associated with FIG. 1. The UE in a RRC_CONNECTED state supports m component carriers CA(1)-CA(m). When the UE sends the capability information message indicating the component carrier capability (e.g. the total number of the component carriers CA(1)-CA(m)), the network determines to configure the measurement gap to at least one of the component carriers CA(1)-CA(m) according to the component carrier capability and the number of the component carriers having been configured to the UE. The detailed description related to the measurement gap configuration determination can be referred from above, so it is not given herein. If the network configures the measurement gap to part of the component carriers, such as the component carrier CA(1), the UE performs the inter-frequency/inter-RAT measurement only using the measurement gap on the component carrier CA(1), thereby avoiding affecting other component carriers (e.g. the component carrier CA(2)-CA(m)) for data transmission/reception. On the other hand, if the network configures the measurement gap to all of the component carriers CA(1)-CA(m), the UE performs the inter-frequency/inter-RAT measurement using the measurement gap on all of the component carriers CA(1)-CA(m). In addition, the UE indicates to the network that the component carrier capability is changed when the UE activates MBMS reception on the dedicated component carrier(s). In addition, the UE indicates to the network that the component carrier capability is (m−1) when the UE having one dedicated component carrier activates MBMS reception on the component carrier, indicates to the network that the component carrier capability is (m−2) when the UE having two dedicated component carriers activates MBMS reception on both the dedicated component carriers, and so on. Thus, the network can clearly know the latest component carrier capability of the UE, and determines whether to configure the measurement gap for the inter-frequency/inter-RAT measurement according to the latest component carrier capability, thereby making measurement gap configuration correctly reflecting the component carrier usage of the UE.

Moreover, the UE may further indicate to the network frequency information of the dedicated component carrier(s) on which the UE receives the MBMS message from the network. Alternatively, the UE may indicate to the network carrier information of the component carrier(s) on which the UE receives the MBMS message from the network. Please note that, the carrier information may include frequency information of the component carrier(s) on which the UE receives the MBMS message, and type information indicating whether the component carrier(s) on which the UE receives the MBMS message is the dedicated component carrier or the mixed component carrier.

Figure 5:
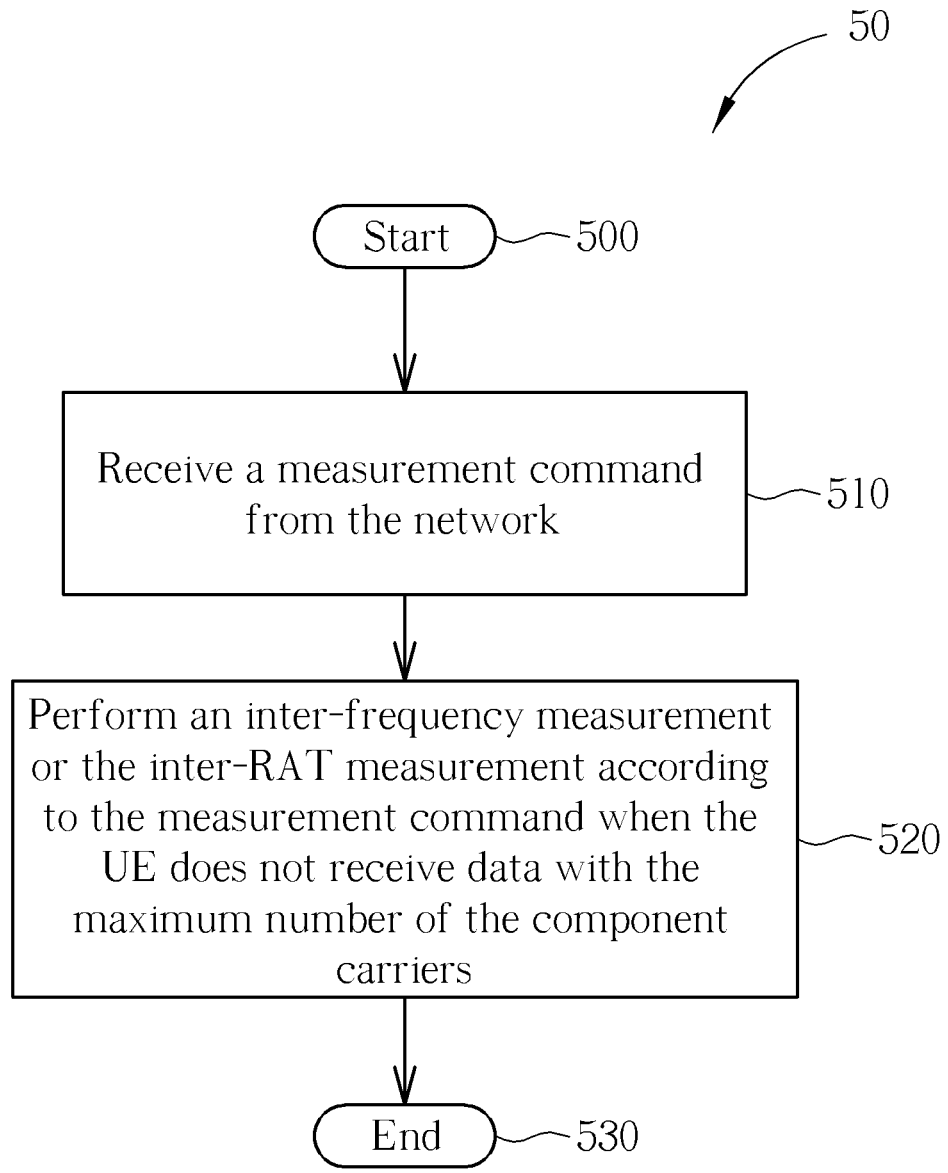

Please refer to FIG. 5, which illustrates a flowchart of an exemplary process 50. The process 50 is utilized in the UE capable of supporting a maximum number of component carriers for handling measurement capability. The process 50 can be compiled into the program code 214 and includes the following steps:

Step 500: Start.

Step 510: Receive a measurement command from the network.

Step 520: Perform an inter-frequency measurement or the inter-RAT measurement according to the measurement command when the UE does not receive data with the maximum number of the component carriers.

Step 530: End.

According to the process 50, the UE performs the inter-frequency/inter-RAT measurement according to the measurement command received from the network without measurement gap configured to any of the component carriers when not all of the component carriers are in-use for data reception. Take an example associated with FIG. 1. As the above mentioned, when the UE receives data on the component carriers CA(1)-CA(m−1), the network does not configure any measurement gap to the UE. In addition, the network can send the measurement command to command the UE to perform the inter-frequency/inter-RAT measurement on the component carrier CA(m). In other words, the UE can perform the inter-frequency/inter-RAT measurement when the UE does not receive data on all of the component carriers CA(1)-CA(m). Please note that, the measurement command can command the UE to perform the inter-frequency/inter-RAT measurement on any of the component carrier(s) that is/are not configured to receive data. The detailed description can be referred from above, so it is not given herein.

Based on the concept of the process 50, when the UE does not receive data with the maximum number of the component carriers, the UE can perform the inter-frequency/inter-RAT measurement without measurement gap assistance of the network.

Figure 6:
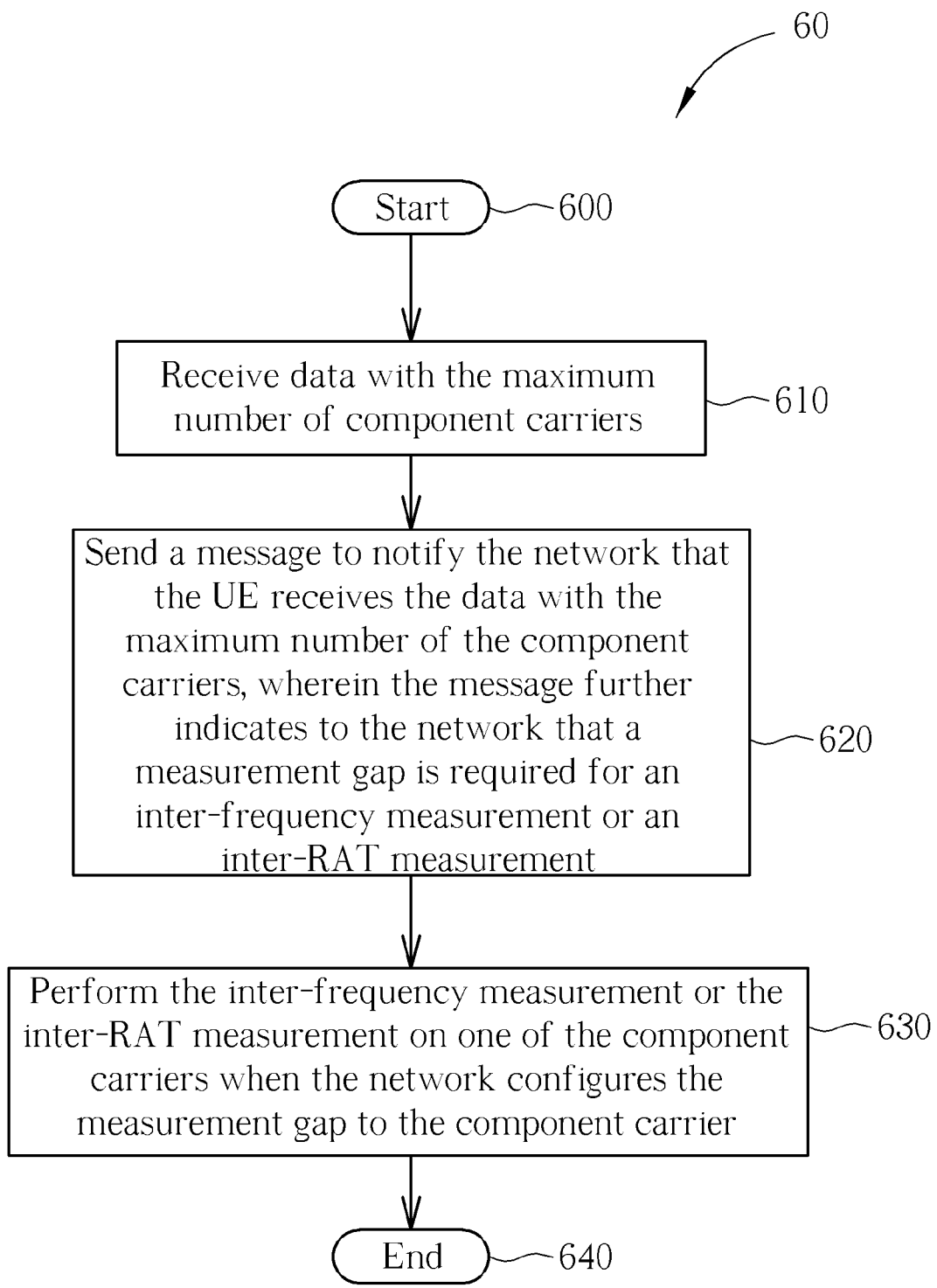

Please refer to FIG. 6, which illustrates a flowchart of an exemplary process 60. The process 60 is utilized in the UE capable of supporting a maximum number of component carriers for handling measurement capability. The process 60 can be compiled into the program code 214 and includes the following steps:

Step 600: Start.

Step 610: Receive data with the maximum number of component carriers.

Step 620: Send a message to notify the network that the UE receives the data with the maximum number of the component carriers, wherein the message further indicates to the network that a measurement gap is required for an inter-frequency measurement or an inter-RAT measurement.

Step 630: Perform the inter-frequency measurement or the inter-RAT measurement on one of the component carriers when the network configures the measurement gap to the component carrier.

Step 640: End.

According to the process 60, when the UE receives data with the maximum number of the component carriers, the UE sends the message to the network for notifying that the UE receives data with the maximum number of the component carriers.

For example, the UE receives data on all of the component carriers CA(1)-CA(m), and then sends the message to notify the network that the UE receives data on all of the component carriers CA(1)-CA(m). In other words, the message indicates to the network that the measurement gap is required for the inter-frequency/inter-RAT measurement. Therefore, the network configures the measurement gap for the inter-frequency/inter-RAT measurement according to the notification message. Please note that, the network can configure the measurement gap to part or all of the component carriers. The detailed description can be referred from above, so it is not given herein.

Figure 7:
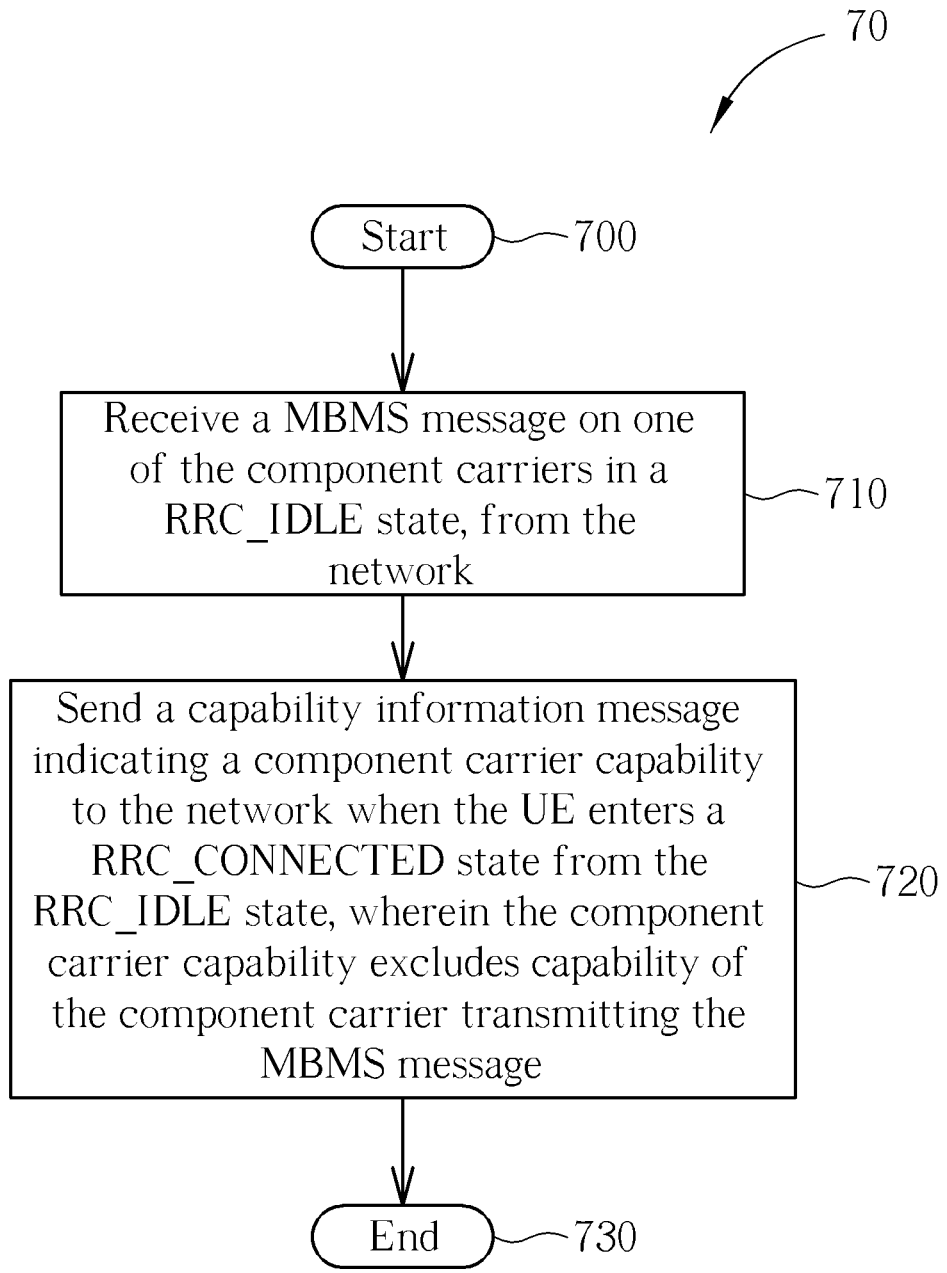

Please refer to FIG. 7, which illustrates a flowchart of an exemplary process 70. The process 70 is utilized in the UE capable of supporting a maximum number of component carriers for handling measurement capability. The process 70 can be compiled into the program code 214 and includes the following steps:

Step 700: Start.

Step 710: Receive a MBMS message on one of the component carriers in a RRC_IDLE state, from the network.

Step 720: Send a capability information message indicating a component carrier capability to the network when the UE enters a RRC_CONNECTED state from the RRC_IDLE state, wherein the component carrier capability excludes capability of the component carrier transmitting the MBMS message.

Step 730: End.

According to the process 70, when the UE in the RRC_IDLE state receives the MBMS message on any of the component carriers, the UE excludes capability of the component carrier(s) from the component carrier capability after entering the RRC_CONNECTED. In other words, After the UE enters the RRC_CONNECTED state from the RRC_IDLE state, the UE sends the capability information message indicating to the network the component carrier capability which does not include the capability of component carrier(s) transmitting the MBMS message. That is, the UE takes a change of the component carrier capability in the RRC_IDLE state into consideration when reporting to the network the component carrier capability in the RRC_CONNECTED state. Therefore, the network can acquire a reliable component carrier capability for the measurement gap configuration determination.

For example, the UE in the RRC_IDLE state receives the MBMS message on the component carriers CA(1)-CA(5). When the UE enters the RRC_CONNECTED state, the UE sends the capability information message indicating the number of component carriers the UE supports is m−5 to the network. Accordingly, the network makes a determination of the measurement gap configuration according to the component carrier capability excluding the capability of the component carriers CA(1)-CA(5).

The capability information message may further indicate frequency information of the component carrier(s) transmitting the MBMS message. In addition, the component carrier(s) transmitting the MBMS message may be a dedicated component carrier.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary examples and means are provided for handling the measurement capability of the UE supporting data transfer of multiple connections (e.g. multiple component carriers or COMP), so as to make a correct determination of measurement gap configuration to the UE, thereby avoiding affecting schedule of the component carrier(s) of the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling measurement capability for a mobile device capable of communicating with a network through a plurality of component carriers in a wireless communication system, comprising:
   receiving a measurement command from the network; and
   performing an inter-frequency measurement without measurement gap configured to any of the plurality of component carriers according to the measurement command, when the mobile device receives data on less than all of the plurality of component carriers.

2. The method of claim 1, further comprising:
   when the mobile device receives a multimedia broadcast multicast service (MBMS) message on a first number of the plurality of component carriers in a radio resource control (RRC) idle state from the network and enters a RRC connected state from the RRC idle state, sending a capability information message indicating a component carrier capability to the network, wherein the component carrier capability indicates a second number of component carriers which is equal to the number of all of the plurality of component carriers minus the first number of component carriers on which the MBMS message is transmitted.

3. The method of claim 2, wherein the capability information message further indicates frequency information associated with the second number of component carriers to the network.

4. The method of claim 1, further comprising:
   performing an inter-frequency measurement with measurement gap configured to any of the plurality of component carriers according to the measurement command when the communication device receives data on all of the plurality of component carriers.

5. A method of handling measurement capability for a mobile device capable of communicating with a network through a plurality of component carriers in a wireless communication system, comprising:
   when the mobile device receives data with all of the plurality of component carriers, sending a message to notify the network that the mobile device receives the data with all of the plurality of component carriers, wherein the message further indicates to the network that a measurement gap is required for an inter-frequency measurement;
   performing the inter-frequency measurement on one of the plurality of component carriers when the network configures the measurement gap to the component carrier; and
   when the mobile device receives a multimedia broadcast multicast service (MBMS) message on a first number of the plurality of component carriers in a radio resource control (RRC) idle state, from the network and enters a RRC connected state from the RRC idle state, sending a capability information message indicating a component carrier capability to the network, wherein the component carrier capability indicates a second number of component carriers which is equal to the number of all of the plurality of component carriers minus the first number of component carriers on which the MBMS message is transmitted.

6. The method of claim 5, wherein the capability information message further indicates frequency information associated with the second number of component carriers to the network.

7. A communication device capable of communicating with a network of a wireless communication system through a plurality of component carriers, for handling measurement capability, comprising:
   a storage unit for storing instructions of:
   receiving a measurement command from the network; and
   performing an inter-frequency measurement without measurement gap configured to any of the plurality of component carriers according to the measurement command when the communication device receives data on less than all of the plurality of component carriers; and
   a processing means, coupled to the storage unit, configured to execute the instructions stored in the storage unit.

8. The communication device of claim 7, wherein the storage unit further stores an instruction of:
   sending a capability information message indicating a component carrier capability to the network when the communication device receives a multimedia broadcast multicast service (MBMS) message on a first number of the plurality of component carriers in a radio resource control (RRC) idle state from the network and enters a RRC connected state from the RRC idle state, wherein the component carrier capability indicates a second number of component carriers which is equal to the number of all of the plurality of component carriers minus the first number of component carriers on which the MBMS message is transmitted.

9. The communication device of claim 8, wherein the capability information message further indicates frequency information associated with the second number of component carriers to the network.

10. The communication device of claim 7, wherein the storage unit further stores an instruction of:

performing an inter-frequency measurement with measurement gap configured to any of the plurality of component carriers according to the measurement command when the communication device receives data on all of the plurality of component carriers.

11. A communication device of a wireless communication system capable of communicating with a network of a wireless communication system through a plurality of component carriers, for handling measurement capability, comprising:

a storage unit for storing instructions of:

sending a message to notify the network that the communication device receives data with all of the plurality of component carriers when the communication device receives the data with all of the plurality of component carriers, wherein the message further indicates to the network that a measurement gap is required for an inter-frequency measurement;

performing the inter-frequency measurement on one of the plurality of component carriers when the network configures the measurement gap to the component carrier; and sending a capability information message indicating a component carrier capability to the network when the communication device receives a multimedia broadcast multicast service (MBMS) message on a first number of the plurality of component carriers in a radio resource control (RRC) idle state from the network and enters a RRC connected state from the RRC idle state, wherein the component carrier capability indicates a second number of component carriers which is equal to the number of all of the plurality of component carriers minus the first number of component carriers on which the MBMS message is transmitted; and a processing means, coupled to the storage unit, configured to execute the instructions stored in the storage unit.

12. The communication device of claim 11, wherein the capability information message further indicates frequency information associated with the second number of component carriers to the network.

* * * * *